(12) United States Patent
Holcomb et al.

(10) Patent No.: US 7,602,174 B2
(45) Date of Patent: Oct. 13, 2009

(54) SENSOR FOR DETECTING DISPLACEMENT

(75) Inventors: Mark A. Holcomb, Tecumseh, MI (US); John Charlton, Tecumseh, MI (US); Conrad Earl Waldorf, Pinckney, MI (US)

(73) Assignee: Syron Engineering & Manufacturing, LLC, Saline, MI (US)

( * ) Notice: Subject to any disclaimer, the term of this patent is extended or adjusted under 35 U.S.C. 154(b) by 350 days.

(21) Appl. No.: 11/361,792

(22) Filed: Feb. 24, 2006

(65) Prior Publication Data

US 2006/0238189 A1 Oct. 26, 2006

Related U.S. Application Data

(60) Provisional application No. 60/674,516, filed on Apr. 25, 2005.

(51) Int. Cl.
*H01F 5/00* (2006.01)
*G01B 7/14* (2006.01)
*B66C 1/42* (2006.01)

(52) U.S. Cl. .............. 324/207.16; 324/207.22; 294/86.4

(58) Field of Classification Search ............ 324/207.11, 324/207.12, 207.13, 207.15–207.18, 207.24, 324/207.25; 294/86.4
See application file for complete search history.

(56) References Cited

U.S. PATENT DOCUMENTS

| 4,170,754 | A | * | 10/1979 | Schmitz et al. | ........ 324/207.17 |
|---|---|---|---|---|---|
| 4,296,364 | A | * | 10/1981 | Fukuyama et al. | .......... 318/572 |
| 4,682,805 | A | * | 7/1987 | Reynolds | .................... 294/86.4 |
| 4,723,503 | A | * | 2/1988 | Yuda | .......................... 116/204 |
| 4,809,191 | A | * | 2/1989 | Domeier et al. | ............. 700/258 |
| 5,777,467 | A | * | 7/1998 | Arms et al. | ............. 324/207.18 |
| 6,339,990 | B1 | * | 1/2002 | Strietzel et al. | ............. 101/408 |
| 7,061,229 | B2 | * | 6/2006 | Townsend et al. | ...... 324/207.12 |

* cited by examiner

*Primary Examiner*—Kenneth J Whittington
(74) *Attorney, Agent, or Firm*—Young Basile Hanlon & MacFarlane P.C.

(57) ABSTRACT

A sensor assembly includes a moveable member and an inductor coil. A flexible inductor member moves relative to the inductor coil in response to movement of the moveable member. This produces an inductance signal that indicates the movement of the moveable member.

21 Claims, 3 Drawing Sheets

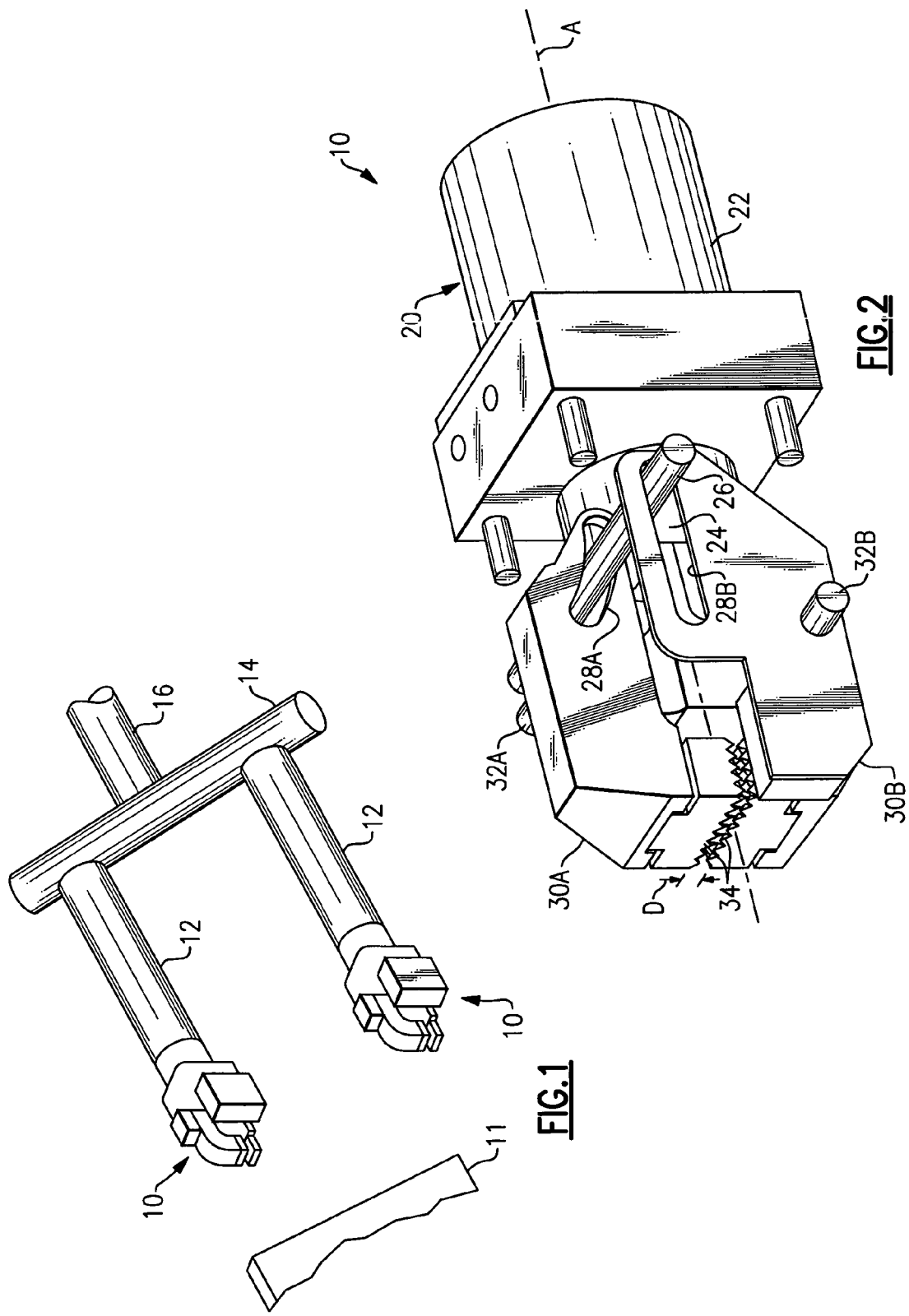

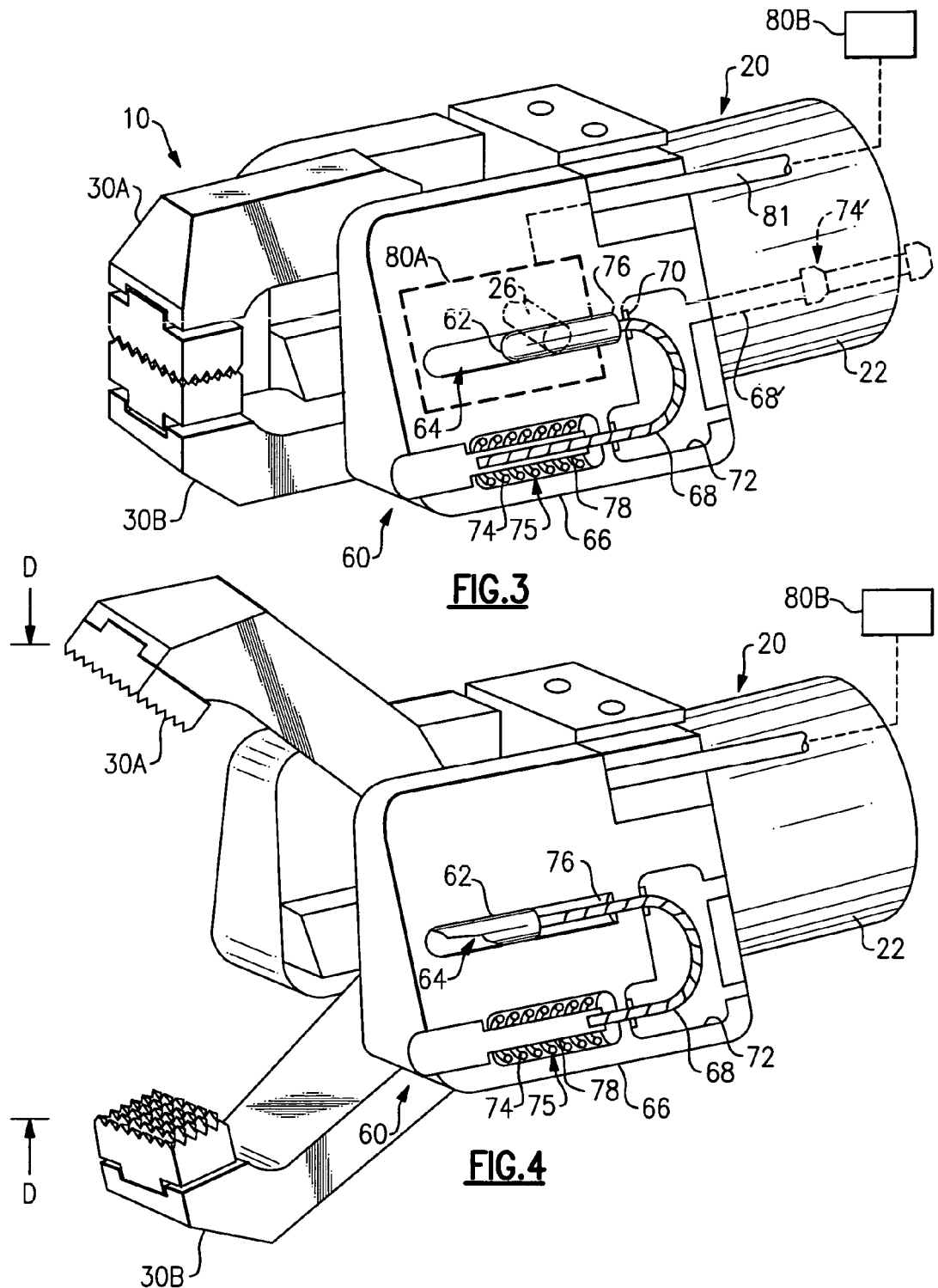

SENSOR FOR DETECTING DISPLACEMENT

This application claims priority to U.S. Provisional Application No. 60/674,516, filed Apr. 25, 2005.

BACKGROUND OF THE INVENTION

This invention relates generally to sensors and, more particularly, to a sensor that utilizes an inductor to detect movement.

Sensors, such as mechanical proximity sensors or displacement sensors, are widely known and used to detect movement or displacement. In one example use, a gripper assembly utilizes a mechanical proximity sensor or displacement sensor to detect a displacement distance between gripper jaws.

Typically, the accuracy of a mechanical proximity sensor or a displacement sensor is sensitive to the positioning of the sensor relative to the moveable parts, such as the gripper jaws. As a result, setup and use of the sensor can be complex and require many adjustments. Furthermore, conventional mechanical proximity sensors or displacement sensors are relatively large and often have undesirably limited capability beyond sensing movement or displacement.

Accordingly, there is a need for a compact sensor assembly to detect displacement and provide additional capability beyond detecting displacement. This invention addresses those needs and provides enhanced capabilities while avoiding the shortcomings and drawbacks of the prior art.

SUMMARY OF THE INVENTION

A sensor assembly according to the present invention includes a moveable member and an inductor coil. A flexible inductor member moves relative to the inductor coil in response to movement of the moveable member. This produces an inductance signal that represents the movement.

In one example embodiment, the sensor assembly is utilized in a gripper assembly. The gripper assembly includes jaws that are moveable between first and second positions. An inductor member moves relative to an inductor coil in response to movement of the jaws to produce an inductance signal that corresponds to movement of the jaws.

One example method of detecting movement includes moving an inductor member relative to an inductor coil in response to gripper jaw movement to produce an inductance signal. A relative gripper jaw position is determined based upon the inductance signal.

The above examples are not intended to be limiting. Additional examples are described below.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

FIG. 1 shows a perspective view of an example gripper assembly in an industrial setting.

FIG. 2 shows a perspective view of one embodiment of an example gripper assembly.

FIG. 3 shows a perspective view of an example sensor that includes an inductor, wherein the gripper jaws of the gripper assembly are moved toward a closed position.

FIG. 4 shows a perspective view of the gripper assembly and sensor that includes an inductor, wherein the gripper jaws are moved toward an open position.

DETAILED DESCRIPTION OF THE REFERRED EMBODIMENT

Figure 5:
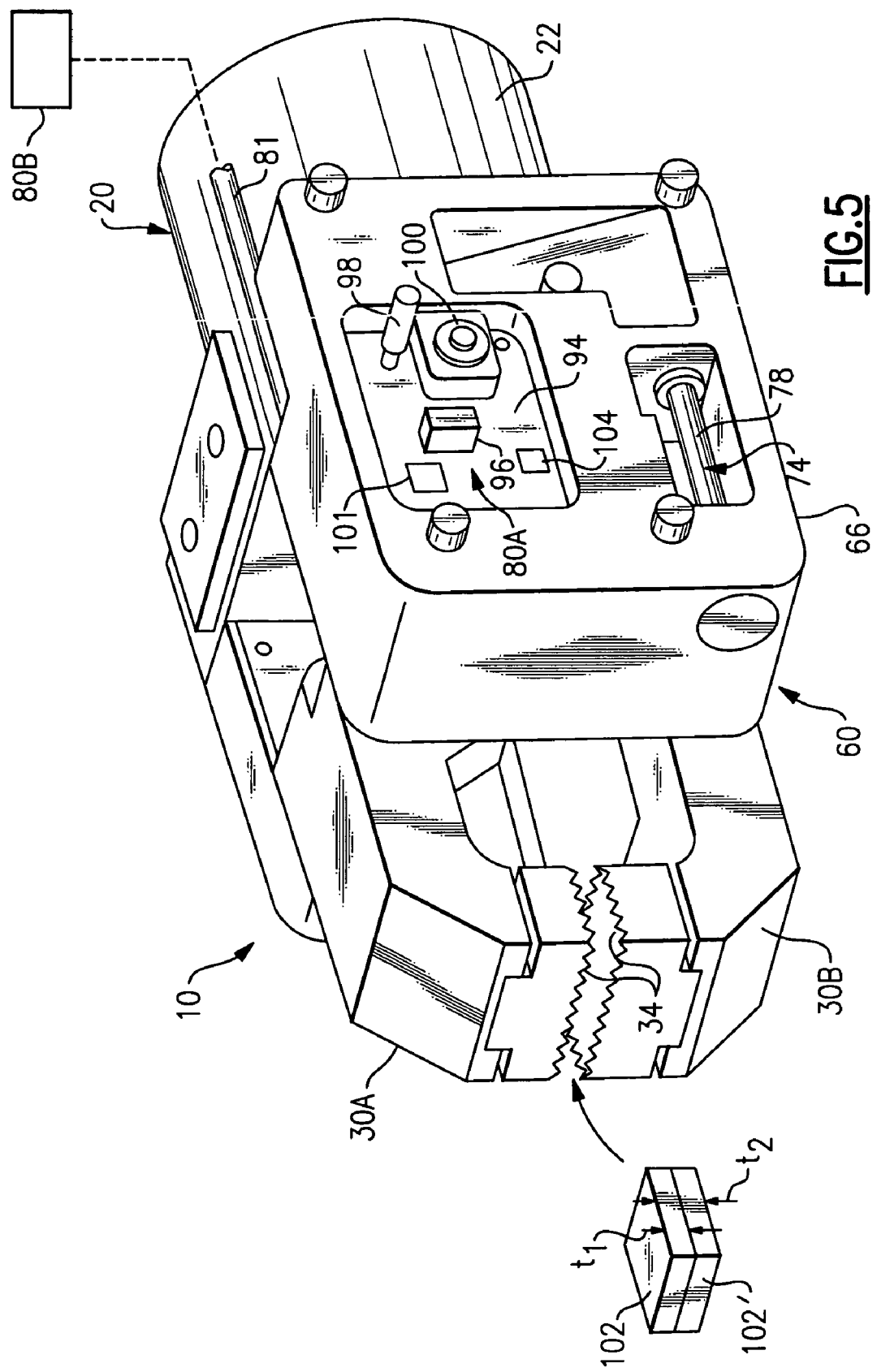
FIG. 5 shows a perspective view of an example gripper assembly having a LED and a calibration button.

FIG. 1 illustrates several gripper assemblies 10 used in an industrial setting to grip and move a work piece 11 (shown schematically). The gripper assemblies 10 are coupled to extended arms 12, which are each secured to a rail 14. An adapter arm 16 is secured to the rail 14. An automated machine (not shown), such as a robot, moves the adapter arm 16, the extended arms 12 and the gripper assemblies 10 to desired positions to retrieve or deposit the work pieces 11.

In one example, the gripper assemblies 10 grip the work piece 11 in a first, retrieval position. The automated machine then moves the adapter arm 16, the extended arms 12 and the gripper assemblies 10 to a deposit location. The gripper assemblies 10 then release the work piece 11 at the deposit location.

FIG. 2 is a perspective view illustrating selected portions of an example gripper assembly 10. In this example, the gripper assembly 10 includes an actuator 20 within a cylinder body 22 that moves a cylinder rod 24 along an axis of movement A. The cylinder rod 24 is coupled to an elongated actuator pin 26 that extends along a direction generally transverse to the axis of movement A in the illustrated example. The elongated actuator pin 26 is received in cam slots 28A and 28B, which define a path of travel for the elongated actuator pin 26. The cam slot 28A defines a curved path, while the cam slot 28B defines an essentially linear path of travel for the elongated actuator pin 26.

The actuator 20 moves the cylinder rod 24 to move the elongated actuator pin 26 from a retracted position shown in FIG. 2 to the ends of the path of travel within the cam slots 28A and 28B. The movement of the elongated actuator pin 26 forces an upper gripper jaw 30A and a lower gripper jaw 30B to pivot respectively about pivot pins 32A and 32B. The upper gripper jaw 30A and the lower gripper jaw 30B each include a gripping surface 34, such as a toothed surface. The upper gripper jaw 30A and the lower gripper jaw 30B move from a closed position to an open position when the elongated actuator pin 26 moves from the retracted position to an extended position.

Referring to the example shown in FIG. 3, the gripper assembly 10 includes a sensor 60 for detecting a displacement between the upper gripper jaw 30A and the lower gripper jaw 30B. It is to be understood that the disclosed gripper assembly 10 is intended as an example use of the sensor 60 and that, given this description, one of ordinary skill in the art will recognize additional uses for the sensor 60 to meet their particular needs.

In this example, the elongated actuator pin 26 (shown in phantom) of the gripper assembly 10 is coupled to a sensor member 62 that moves back and forth within a slot 64 of a sensor housing 66. The sensor member 62 is coupled to an inductor line 68, such as a flexible steel cable or other type of flexible cable, which extends through a seal member 70 within the housing 66 and into a cavity 72. The cavity 72 provides a passage for the inductor line 68.

In the illustrated example, the inductor line 68 curves through the cavity 72 into an inductor 74 having coils 75. The curving of the inductor line 68 through the cavity 72 provides for a compact sensor 60 assembly. Alternatively, the inductor (indicated by 74') is longitudinally aligned with the slot 64 such that the inductor line (indicated by 68') extends approximately linearly instead of curving. This configuration is beneficial, for example, for narrower and longer gripper assemblies but is not limited to such assemblies.

The seal member 70 allows movement of the inductor line 68 back and forth through the seal member 70, but prevents dust or debris from entering the cavity 72 as the inductor line 68 moves. In one example, the inductor line 68 is soldered to the sensor member 62.

As the sensor member 62 moves back and forth within the slot 64, the inductor line 68 flexes through the curvature of the cavity 72 to extend into and retract out of the inductor 74. In the retracted position shown in FIG. 3 (i.e., when the gripper jaws 30A and 30B are moved toward closed), the elongated actuator pin 26 is in a retracted position and the sensor member 62 is positioned towards a retracted end 76 of the slot 64. In this position, the inductor line 68 extends into a tube portion 78 of the inductor 74.

The inductor coils 75 produce an inductance based upon the position of the inductor line 68 within the inductor 74. That is, extension of the inductor line 68 into and out of the tube portion 78 changes a magnitude of an inductance signal produced by the inductor 74. In one example, the inductance signal is in the form of an electrical signal having an associated oscillating waveform and frequency. In another example, when the inductor line 68 is fully extended into the tube portion 78, the inductor 74 produces a maximum inductance signal. The inductor 74 transmits the inductor signal to a control 80A within the sensor housing 66.

In one example, use of the inductor line 68 and the inductor 74 provides a robust sensor 60 that is relatively insensitive to positioning on the gripper assembly 10. That is, as long as the inductor line 68 is able to move in and out of the inductor 74, the movement of the upper and lower gripper jaws 30A and 30B can be detected via the inductor signal. This eliminates the need to precisely position the sensor 60 on the gripper assembly 10.

The control 80A receives the inductance signal from the sensor 60. The signal corresponds to the position of the inductor line 68, which corresponds to the position of the sensor member 62 along the slot 64 and to the position of the elongated actuator pin 26 between the retracted and extended positions. The position of the elongated actuator pin 26 corresponds to the displacement between the upper gripper jaw 30A and the lower gripper jaw 30B. The control 80A determines the displacement D based upon the signal communicated from the sensor 60. In one example, this determination is made in a known manner of correlating electronic signals to displacement values.

In one example, the inductor 74 produces an inductance signal throughout the stroke of the actuator pin 26 and transmits the inductance signal to the control 80A. The control 80A determines the displacement between the upper and lower gripper jaws 30A and 30B in response to every peak of the associated oscillating waveform of the inductance signal over the stroke. This occurs in a relatively short amount of time such that the displacement is provided in real-time and can be displayed or monitored in real-time. Optionally, the control 80A utilizes the frequency, which includes a time component, to determine the change in displacement versus time (i.e., rate of displacement of the upper and lower gripper jaws 30A and 30B). In one example, the rate is transmitted to the remote controller 80B for display.

In the illustrated example, the control 80A utilizes a logic function to compare the displacement D between the upper and lower gripper jaws 30A and 30B to a stored value, such as a known displacement. In one example, if the displacement D is within a predetermined percentage of the stored value, then the control 80A transmits a first signal through an output line 81 to a remote controller 80B. In one example, the predetermined percentage is 10%. If the displacement D is not within the predetermined percentage, the control 80A transmits a second signal through the output line 81 to the remote controller 80B. In one example, the remote controller 80B indicates an error condition in response to the second signal (e.g., an indicator illuminates).

FIG. 4 illustrates an example of the sensor 60 wherein the elongated actuator pin 26 moves from the retracted position (FIG. 3) to an extended position toward an end portion 82 of the slot 64. In this position, movement of the elongated actuator pin 26 to the left in FIG. 4 moves the sensor member 62 to the left and retracts the inductor line 68 to the right and out of the tube portion 78 of the inductor 74. The retraction of the inductor line 68 changes the induction signal produced by the inductor 74. In one example, the change in induction within the inductor 74 corresponds to the magnitude of the movement of the elongated actuator pin 26, and is thus proportional to the displacement D between the upper gripper jaw 30A and the lower gripper jaw 30B.

In a further example, the induction signals produced in the disclosed examples are calibrated as described below such that the sensor 60 and control 80A reliably interpret the inductance signals. FIG. 5 illustrates selected portions of the sensor 60, including the control 80A for calibrating the sensor 60. In this example, the control 80A includes a circuit board 94 having a programming port 96 capable of receiving a corresponding programming member (not shown) to initialize the circuit board 94. A LED 98 provides visual indications of various operating conditions of the gripper assembly 10 and sensor 60. The circuit board 94 includes a calibration button 100 for calibrating, or zeroing, the sensor 60 and a memory 101, such as a flash memory, for storing calibration or other information.

In one example method of calibrating the gripper assembly 10 and the sensor 60, a user inserts a single work piece 102 between the upper gripper jaw 30A and the lower gripper jaw 30B. The user then actuates the gripper assembly 10 to close the gripper jaws 30A and 30B around the work piece 102 and pushes the calibration button 100 once. Pressing the calibration button 100 once indicates to the control 80A that there is one work piece 102 between the gripper jaws 30A and 30B. The control 80A stores the thickness of the single work piece 102 as $t_1$, for example, in the memory 101. The user then actuates the gripper assembly 10 to open the gripper jaws 30A and 30B and inserts a second work piece 102' in addition to the first work piece 102 between the gripper jaws 30A and 30B. The gripper jaws 30A and 30B are then closed around the two work pieces 102 and 102', and the user pushes the calibration button 100 twice. This indicates to the control 80A that two work pieces 102 and 102' are between the gripper jaws 30A and 30B. The control 80A stores a thickness, $t_2$ for example, of the two work pieces 102 and 102' in the memory 101.

In the illustrated example, the control 80A utilizes the stored values of $t_1$ and $t_2$ to indicate whether an error condition exists, as described below. Optionally, the stored values $t_1$ and $t_2$ are values that are entered via remote controller 80B rather than by calibration. In one example, the entered values correspond to a customer set point.

In one example of detecting an error condition, the gripper assembly 10 repeatedly performs a gripping cycle. One gripping cycle includes opening the gripper jaws 30A and 30B once and then closing the gripper jaws 30A and 30B. One gripping cycle occurs when the gripper assembly 10 receives and grips a desired number of work pieces, moves the desired number of work pieces from one location to another and deposits the desired number of work pieces at the new location. In this process, the gripper assembly 10 could accidentally receive more than or less than the desired number of work pieces between the gripper jaws 30A and 30B (i.e., an error condition).

To detect the error condition, the control 80A measures the displacement D between the gripper jaws 30A and 30B via the sensor 60 for each gripping cycle and compares that displacement D to the stored values $t_1$, $t_2$, and a zero value. In one example, the desired number of work pieces 102 is one. If the measured displacement D is close to $t_2$ (which represents a thickness of two work pieces), the control 80A determines that the gripper assembly 10 has accidentally received two work pieces rather than one and transmits a signal representative of this error condition to the remote controller 80B, which warns the user of the error condition, such as by illuminating a red light.

If the detected displacement D is close to the value of $t_1$ (which represents the thickness of one work piece), the control 80A indicates this condition. In one example, a green light is illuminated to indicate this condition. In one example, the relative closeness to $t_1$ or $t_2$ is determined relative to a percentage of $t_1$ or $t_2$, such as 5%, 10%, 25%, or other chosen threshold. In one example, the control unit provides an indication of two conditions. One condition is when a work piece is close to or greater than $t_2$. A second condition is when the work piece is close to $t_1$.

If the detected displacement D is close to the zero value, the control 80A determines that the gripper assembly 10 did not receive any work pieces and the control 80A transmits a signal representative of this error condition to the remote controller 80B, which warns the user of the error condition. In one example, this condition is indicated by illuminating a red light.

In another example, if the detected displacement is close to the zero value, the control 80A takes no action. In this example, the absence of a signal is warning that no work pieces were received by the gripper assembly 10.

The disclosed example calibration method provides the benefit of identifying when the gripper assembly 10 receives more or less than one work piece. Additionally, using the calibration points allows for a dynamic threshold centered around the single work piece setting. This allows a less sensitive threshold for thicker parts which may have bowed features and more sensitive threshold for thinner pieces. This provides the benefit of eliminating false indications common to the prior art. It is to be understood, however, that the desired numbers of work pieces will vary depending on the needs of the particular application.

In another example, visual confirmation is used to indicate whether a desired number of work pieces are between the upper and lower gripper jaws 30A and 30B. In one example, a red light is illuminated when the upper and lower gripper jaws 30A and 30B are displaced an amount outside of a threshold percentage of $t_1$, 25% for example. As an operator closes the upper and lower gripper jaws 30A and 30B to a displacement within 25% but greater than a second threshold percentage, such as 10%, a green light flashes. When the operator closes the upper and lower gripper jaws 30A and 30B to a displacement within the second threshold, such as less than 10%, the green light ceases flashing and is illuminated green continuously. This provides the benefit of visual confirmation when the displacement between the upper and lower gripper jaws 30A and 30B is within a desired range. Given this description, one of ordinary skill in the art will recognize alternative thresholds and visual indicators to meet their particular needs.

Optionally, the control 80A includes a counter 104. The counter 104 increases by one increment for every cycle of opening and closing the gripper jaws 30A and 30B (i.e., a gripping cycle). In one example, the counter 104 counts and stores in a memory, such as memory 101, the number of cycles over the lifetime of the gripper assembly 10. The manufacturer of the gripper assembly 10 or user of the gripper assembly 10 may then access the counter 104 of the control 80A through the remote controller 80B to determine the number of gripping cycles. In one example, the value of the counter 104 is used to determine when routine maintenance occurs for the gripper assembly 10 and/or the sensor 60.

Optionally, the sensor 60 and the control 80A account for wear of the gripper assembly 10 over time. In one example, after repeated gripping cycles, the components of the gripper assembly 10 and/or gripping surfaces 34 of the gripper jaws 30A and 30B may wear. If the wear becomes significant, the detected displacement D between the gripper jaws 30A and 30B may be inaccurate. To account for the wear, the control 80A determines an average displacement D over a predetermined number of gripping cycles of the gripper assembly 10. In one example, the predetermined number of gripping cycles can be set to any number between zero and a number approaching infinity. In another example, the number is set to correspond to a desired maintenance interval.

In one example, the number is sixteen cycles and the average over the sixteen gripping cycles is compared to a previous average determined from sixteen previous gripping cycles. If the two averages differ by more than a threshold amount, the control 80A determines that the calibration zero point should be adjusted by the changed amount between the averages. The control 80A then adjusts future displacement values D detected by the sensor 60 based upon the changed amount. Given this description, one of ordinary skill in the art will recognize that the number of gripping cycles used to determine whether or not wear has occurred can be adjusted to meet their particular needs. This feature provides the benefit of automatically detecting and accounting for wear that may occur between parts of the gripper assembly 10 or between the gripping surfaces 34 of the gripper jaws 30A and 30B.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A gripper assembly comprising:
    jaws moveable between a first position and a second position;
    an inductor; and
    a flexible inductor member that moves relative to the inductor in response to movement of the jaws to produce an inductance signal that corresponds to movement of the jaws, wherein said inductor member includes a first portion and a second portion connected to the first portion by a turn portion such that the second portion extends back toward the first portion.

2. The assembly as recited in claim 1, wherein said inductor member comprises a flexible metal cable.

3. The assembly as recited in claim 1, including an actuator that moves an actuator pin to move said jaws, and said inductor member includes a first portion connected to said actuator pin.

4. The assembly as recited in claim 3, wherein said inductor member includes a second portion received at least partially in said inductor.

5. The assembly as recited in claim 1, comprising a controller that receives said inductance signal and determines a displacement between said jaws.

6. The assembly as recited in claim 5, comprising an indicator that indicates said displacement between said jaws.

7. The assembly as recited in claim 6, comprising a memory portion that stores predetermined limits, wherein said controller selectively actuates said indicator when said displacement is within a selected percentage of said predetermined limits.

8. The assembly as recited in claim 5, wherein said controller includes a counter portion that counts a number of movements of the jaws.

9. The assembly as recited in claim 1, wherein said first position corresponds to a closed position of said jaws and said second position corresponds to an open position of said jaws.

10. A gripper assembly comprising:
jaws moveable between a first position and a second position;
an inductor;
an actuator that moves an actuator pin to move said jaws; and
an inductor member that moves relative to the inductor in response to movement of the jaws to produce an inductance signal that corresponds to movement of the jaws, wherein said inductor member includes a first portion connected to said actuator pin and a second portion received at least partially in said inductor, and wherein said first portion and said second portion move in transverse directions in response to movement of said jaws.

11. A gripper assembly comprising:
jaws moveable between a first position and a second position;
an inductor;
an actuator that moves an actuator pin to move said jaws; and
an inductor member that moves relative to the inductor in response to movement of the jaws to produce an inductance signal that corresponds to movement of the jaws, wherein said inductor member includes a first portion connected to said actuator pin and a second portion received at least partially in said inductor, and wherein said first portion and said second portion move in opposite directions in response to movement of said jaws.

12. A method of detecting movement of a gripper law, comprising the steps of:
moving a flexible inductor member relative to an inductor in response to movement of a gripper jaw to produce an inductance signal, wherein moving the flexible inductor member includes moving, in opposite directions, a first portion of the flexible inductor member that is connected to an actuator pin and a second portion of the flexible inductor member that is located at least partially in the inductor; and
determining a relative gripper jaw position based upon the inductance signal.

13. The method as recited in claim 12, including the step of flexing the inductor member in response to movement of the gripper jaw.

14. The method as recited in claim 12, including the step of determining a rate of gripper jaw movement based upon the inductance signal.

15. The method as recited in claim 12, including the step of illuminating an indicator light if the relative gripper jaw position is near a predetermined jaw position.

16. The method as recited in claim 12, including the steps of at least one of illuminating an indicator light in a first illuminated state if the relative gripper jaw position is within a predetermined threshold, illuminating the indicator light in a second illuminated state if the relative gripper jaw position is within a preset percentage of the predetermined threshold, and illuminating the indicator light in a third illuminated state if the relative gripper jaw position is outside of the predetermined threshold.

17. The method as recited in claim 12, including the step of determining a number of work pieces between the gripper jaws based upon the inductance signal.

18. The method as recited in claim 12, including the steps of calibrating the inductance signal to a desired number of work pieces by placing the desired number of work pieces between the gripper jaws, moving the gripper jaws to a closed position, and storing the inductance signal that corresponds to the closed position.

19. The method as recited in claim 12, including the steps of determining at least a first calibration point that corresponds to a single work piece and determining a second calibration point that corresponds to at least two work pieces based upon the relative gripper jaw position.

20. A gripper assembly comprising:
jaws moveable between a first position and a second position;
an inductor; and
a flexible inductor member that moves relative to the inductor in response to movement of the jaws to produce an inductance signal that corresponds to movement of the jaws, wherein said inductor member includes a first portion and a second portion connected to the first portion by a turn portion such that the second portion extends approximately parallel with the first portion.

21. A gripper assembly comprising:
jaws moveable between a first position and a second position;
an inductor; and
a flexible inductor member that moves relative to the inductor in response to movement of the jaws to produce an inductance signal that corresponds to movement of the jaws, wherein said inductor member includes a first linear portion and a second linear portion connected to the first portion by a turn portion.

* * * * *